Patented Sept. 8, 1925.

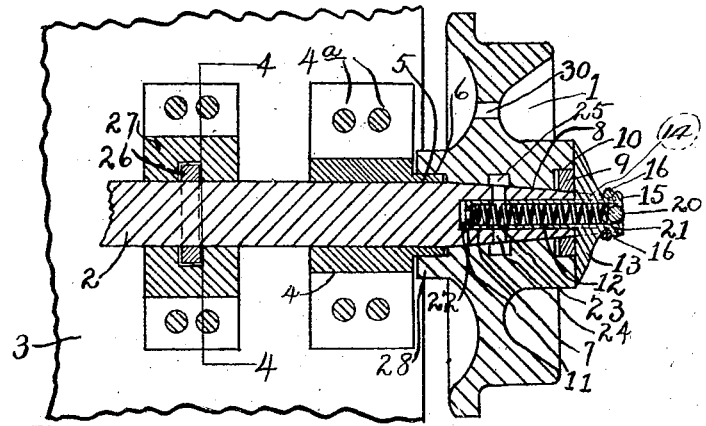

1,552,542

UNITED STATES PATENT OFFICE.

ROBERT J. COLSON, OF ST. LOUIS, MISSOURI.

MINE-CAR TRUCK.

Application filed July 3, 1924. Serial No. 723,920.

*To all whom it may concern:*

Be it known that I, ROBERT J. COLSON, a citizen of the United States, residing at St. Louis, Missouri, have invented a certain new and useful Improvement in Mine-Car Trucks, of which the following is a specification, such as will enable others skilled in the art to which it appertains to make and use the same.

My invention relates generally to a new and useful improvement in mine car truck construction and more particularly to the type adapted to be lifted from the rails for dumping purposes.

One object of my invention is to provide the truck axles with centering means so that when the wheels are clear of the rails during the dumping operation, there will be no disalignment with the rails.

Another object is to provide a wheel bearing that will minimize or eliminate lateral movement of the wheels in relation to the car body so that the car may be quickly and easily replaced on the rails after dumping.

A further object is to provide an easy and economical means to lubricate the wheel bearing using fewer parts and being cheaper in manufacturing and assembly cost than the customary types now used.

A still further object is to provide a means of holding the wheels on the axles so that a positive connection is made, yet permitting free access to the ends of the hollow axles so that lubricant may be introduced therein.

With these and other objects in view, my invention consists in certain novel features of construction and arrangement of parts hereinafter more fully described and claimed, and illustrated in the drawings, in which—

Figure 1 is a horizontal cross sectional view taken through the center of a mine car truck axle showing the means of centering the axle and the method of holding the wheel in place and the lubricating means.

Figure 2 is an enlarged horizontal cross section of the wheel bearing and the lubrication passageways.

Figure 3 is an end view of the car axle and wheel, showing the means for holding the wheel in place.

Figure 4 is a cross section taken on line 4—4 of Figure 1.

Figure 5 is an enlarged cross section of a wheel bearing.

The wheel 1 in the drawings carries axles 2 and mine car body 3 through the axle bearing 4. The axle bearing 4 which is held in place on the car body by bolts $4^a$ is provided with a projecting lip 5 which extends into a recess 6 in the inner face of the hub of wheel 1. The outer end 7 of the axle is tapered as is the central opening 8 of the hub. A washer 9 fits the axle and is positioned in a recess 10 in the outer face of the wheel hub.

Axle 2 is hollowed at 11 to receive the projection 12 of the closure disk 13. The disk 13 rests against the outer face of the hub and holds washer 9 in position. The hollow tapered end of axle 2 is partly cut away at 14 to engage and project through disk 13. The outer end of the closure disk is enlarged at 15 and a U-bolt 16 is placed over the small diameter portion of the disk. U-bolt 16 engages groove 17 in the axle and locks the axle firmly with the closure disk. A tie bar 18 and bolts 19 lock U-bolt 16 firmly in position. This method of holding the wheel on the axle is positive and permits free access to the end of the axle for lubrication purposes, as hereinafter described.

Lubrication is obtained through the closure disk 13 which is hollowed from the enlarged end 15 through the projecting end 12 which lies in the hollowed portion of the axle. A ball 20 is seated at the outer end of this hollowed portion and held against its seat by spring 21. Spring 21 is in turn held in position by lips 22 on the inner end of the hollowed portion. Passageways 23 are drilled through projection 12 and corresponding passageways 24 are drilled in the tapered portion 7 of the axle. These passageways connect with the distributing groove 25 in the central portion 8 of a wheel hub.

To use this lubricating system, an oil can or gun is inserted past the ball 20 which yields with spring 21. The oil is squirted into the hollow portion of the closure disk. Movement of the car will distribute the oil through the passageways 23 and 24 to the wheel hub from where it will travel into the axle bearing 4 and the washer 9, thus thoroughly lubricating all the working parts.

A disk 26 is shrunk onto the central portion of the axle and fits into a housing 27 which is bolted to the underside of the car body 3. This disk is normally free but it will only permit a very slight lateral displacement of the car body in relation to the axles and wheels. The object of this is to maintain the relative positions of the parts during the dumping operation.

In the type of car customarily in use, the lateral movement of the axle permits sufficient displacement of the wheels in relation to the body so that when the car is dumped the wheels, upon being returned, are not necessarily aligned with the rails. In my construction the relative movement between these parts is so limited that the car will always return to the rails if the dumping mechanism is properly placed. The tapered hub permits this portion of the wheel to be chilled in casting as well as the flange and thereby greatly lengthens the life of the wheel.

Projecting projections 28 and 29 of the hub on either side serve as a seal together with the lip 5 of the axle journal on the inner side and the closure disk 13 and washer 9 on the outer side, thus keeping out dirt and foreign matter which is very apt to accumulate in the working parts of cars used in mines and the like. This feature makes the lubricant last longer and practically eliminates the necessity of disassembly for cleaning purposes. Openings 30 are provided in the wheel so that a rod or stick (not shown) may be inserted to hold the car on an incline.

The type of wheels on my mine car truck require less power for operation since the surface of the wheel bearing is small due to the taper of the axle and wheel opening. Some of the advantages of the ball or roller bearing is obtained thus without the high cost of manufacture of these types. The tapered connections between the wheels and axles are not only more economical of operation but also serve to position the wheels, that is, the tapers on the ends of the axles determine the distance of the wheels from each other. It can be readily seen that the wheeled bearings will in this way aid the axle centering means in maintaining the proper relation of the car body, axles, and wheel each to the other at all times.

It will be readily understood that minor changes in the size, form and construction of the various parts of my improved mine car truck may be made and substituted for those herein shown and described, without departing from the spirit of my invention as expressed in the appended claims.

I claim:

1. A mine car truck comprising a wheel, an axle carried by said wheel, said axle being slotted in its end, and a disk slotted for interengagement with the end of said axle.

2. A mine car truck comprising a wheel, an axle carried by said wheel, said axle being slotted in its end, a disk slotted for interengagement with the end of said axle, and means for holding said wheel in place.

3. In a mine car truck, a wheel, an axle carried thereby and having portions of its end cut away, and a disk non-rotatably adapted to interengage with the end of said axle to hold said wheel in place.

4. In a mine car truck, a wheel, an axle carried thereby, said axle having its end portion tapered, a disk engaging said axle and bearing against the hub of said wheel, said disk interengaging with said axle, a groove in said disk, and a groove in said axle, which grooves are aligned with each other at the point of interengagement, and a U-bolt in said grooves.

5. In a mine car truck, a wheel having a tapered axial opening, an axle carried thereby, the end of which is correspondingly tapered and partially cut away transversely of its axial dimension, and means interengaging with said cut-away portion of said axle to hold said axle and said wheel operably together.

6. In a mine car truck, the combination of a wheel having an axial opening, an axle carried thereby, a car body having fixed thereto an axle bearing for cooperation with said axle, a lip projection on said axle bearing extending into said axial opening in said wheel, a washer disposed opposite said projecting lip and also fitting said axial opening, and a relatively large closure member on the outer end bearing against the wheel hub, the combination forming a substantially dust-proof wheel bearing.

7. In a mine car truck, a wheel, an axle having a longitudinally disposed opening carried thereby, said opening extending only a portion of the length of the wheel bearing, a tubular member extending into said axial opening, a yielding closure member at the outer end of said tubular member, and means in said tubular member, axle and wheel to permit the distribution of a lubricant introduced through said tubular member.

8. In a mine car truck, a wheel, an axle having a longitudinally disposed opening carried thereby, said opening extending only a portion of the length of the wheel bearing, a tubular member extending into said axial opening, a closure member at the outer end of said tubular member, and means in said tubular member, axle and wheel to permit the distribution of a lubricant introduced through said tubular member.

9. In a mine car truck, the combination with an axle, the ends of which are tapered, wheels having an axially disposed central opening tapered from end to end to correspond with the ends of said axle so that the wheels may be set on said axle a predetermined distance apart, a car body, and means on said car body engaging said axle intermediate its ends to prevent lateral movement relative to said car body independent of said wheels.

10. In a mine car truck, a wheel, a rotatable axle carried thereby, a car body carried by said axle, a projecting flange carried by said axle, and means enclosing said flange to limit lateral movement of said axle in either direction in relation to said car body.

11. In a mine car truck, a wheel, an axle carried thereby, a car body carried by said axle, a peripheral flange on said axle, and a housing fixed to said car body adapted to enclose said peripheral flange without normally contacting therewith.

12. In a mine car truck, a wheel having a hub with oppositely disposed recesses, said wheel having a tapered axial opening therein, a hollowed axle, the end of which is correspondingly tapered to fit said wheel, an axle bearing, a projecting lip on said bearing adapted to engage one of said hub recesses, a washer on said axle fitting in the opposite recess of the hub, a disk having a tubular projection extending into said hollowed axle, the body of said disk closely fitting the outer face of said hub, and means for introducing a lubricant to the working parts of the wheel through said tubular projection of said disk.

In testimony whereof I hereunto affix my signature this 26th day of June, 1924.

ROBERT J. COLSON.